Patented May 26, 1925.

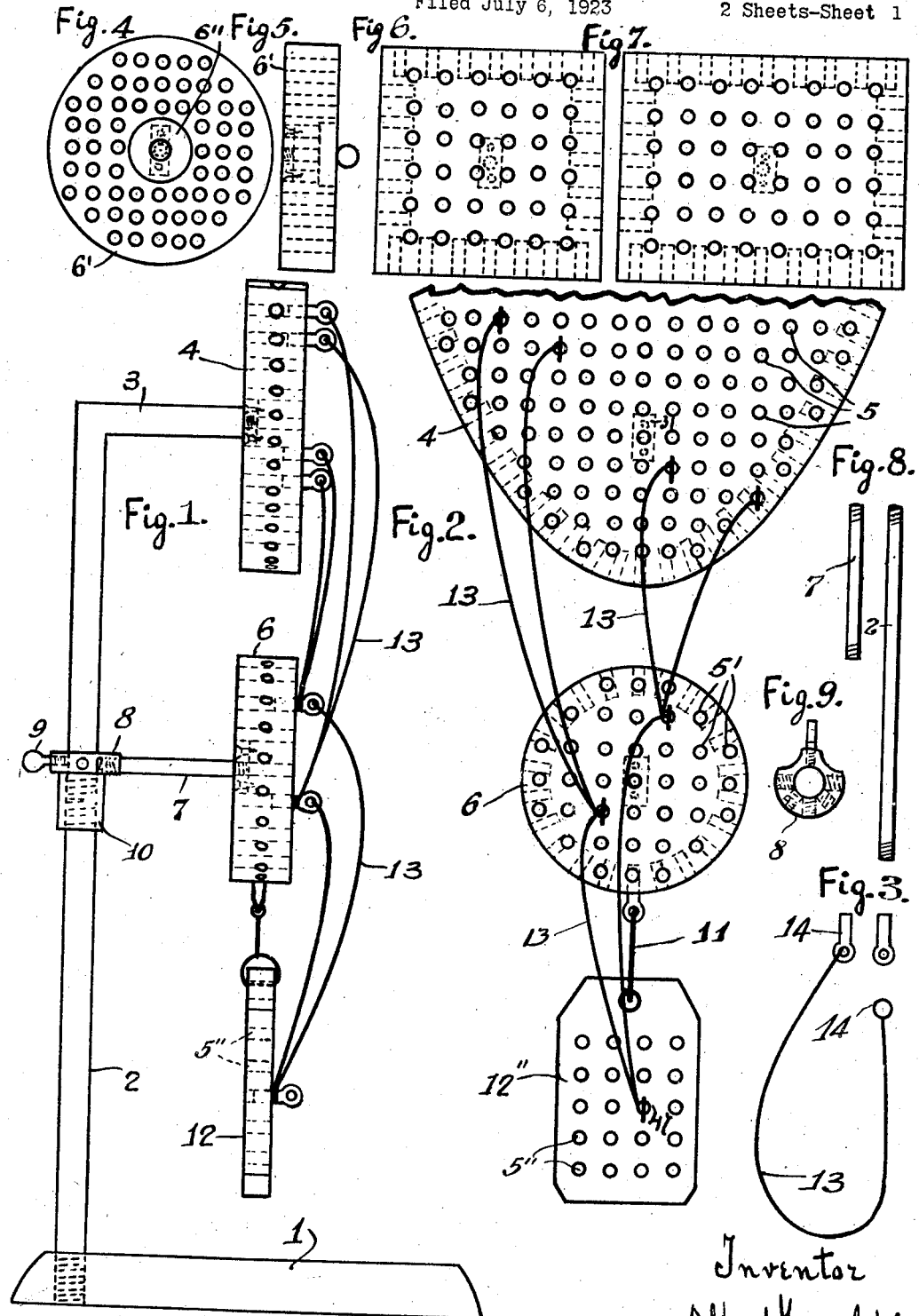

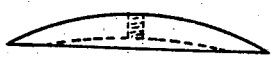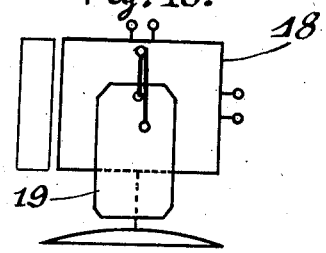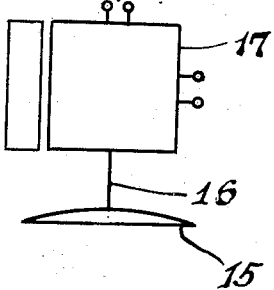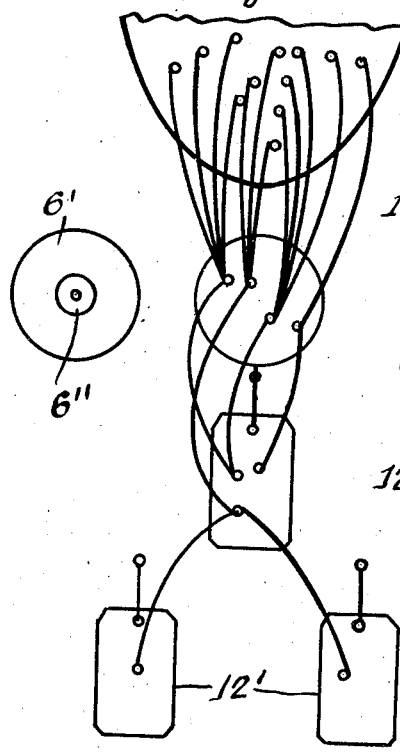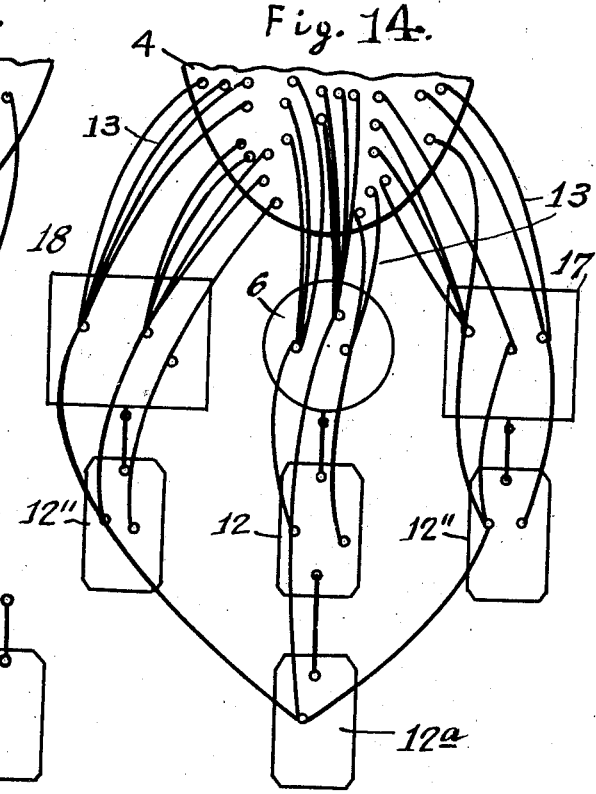

1,539,194

UNITED STATES PATENT OFFICE.

ALFRED KORZYBSKI, OF NEW YORK, N. Y.

EDUCATIONAL APPLIANCE.

Application filed July 6, 1923. Serial No. 649,844.

*To all whom it may concern:*

Be it known that I, ALFRED KORZYBSKI, a citizen of Poland, residing in New York city, State of New York, have invented a new and useful Educational Appliance, for illustrating among other things—

(1) The working of a human mind and differentiating it from the working of the animal nervous and brain systems;

(2) The building up of abstractions of higher and higher orders, the number of possible selections of which grow according to the orders of mathematical combinations of higher order, and therefore grow extremely rapidly;

(3) The fundamentals of the theory of relativity, a subject of universal human interest, and of extreme practical importance, demonstrating that the "reality" which is made up of "events" is in fact made up of "matter," "space," and "time" indivisibly connected, and can be divided only by mental process of abstraction, thereby emphasizing some aspects and disregarding others, although they are all ever indivisibly present;

(4) The fact that "absolutism" (meaning the absence of the consciousness of abstracting) is a necessary condition for non-critical imitation of the animals resulting in the same erroneous beliefs;

(5) The fact that the human mind when it works true to its natural laws must have the relativity point of view obtainable only by the consciousness of abstracting;

(6) The fact that correct thinking and reasoning, continuous, conscious abstracting, in order that one may fully realize that words, names or labels do not cover all characteristics of an object, and that the characteristics of the objects are not the same in number and quality as the characteristics of the event;

(7) The fact that with the consciousness of abstracting, the human mind works as human (as differentiated from animal) and must deal with abstractions as abstracts rather than with the physical, independent, existing entities and must never "objectify" labels and symbols.

With these objects in view, the invention consists, generally stated, in providing three separate bodies, one having a large number (indicative of an infinite number) of points of connection for a suitable cord, line or wire, each of these points of connection corresponding to one of the infinite qualities or characteristics which events in the universe possess; a second one having similar points of connection, but limited in number, indicative of the varying qualities or characteristics that an object may possess, and a third having a still smaller number of points of connection indicative of those particular characteristics or qualities which may be referred to in defining the object. These several members are carried by a suitable support having lines of connection extending from various points in the first body to the second and from the second body to the third. These lines of connection are preferably effected by means of pins at the two ends of the lines which may be plugged into holes corresponding to the different characteristics or qualities, though any other desired effective means of connecting the several points between the several bodies may be employed.

The inventive idea is capable of being embodied in a variety of structures, some of which for the purpose of illustrating the invention are shown in the accompanying drawings, but it is to be expressly understood that these drawings are for the purposes of illustration only and are not designed to define the limits of the invention, reference being had to the appended claims for this purpose.

In said drawings,

Fig. 1 is a side elevation of one form of the invention mounted on a suitable support;

Fig. 2 is a front elevation of Fig. 1 with the supporting member omitted;

Fig. 3 is a detail of the connecting line and pins employed;

Fig. 4 is a front elevation and Fig. 5 a side elevation of one form of body that may be employed for representing the animal object;

Fig. 6 is a front elevation of another form of object;

Fig. 7 is a like elevation of still another form of object;

Fig. 8 shows two supporting rods that may be employed to connect the objective body with a suitable stand;

Fig. 9 is a detail of one of the elements shown in Fig. 1 for attaching the objective body to the upright standard or support;

Figs. 10 and 11 are front elevations of a modified form of the invention;

Fig. 12 is a side elevation of the post upon which the structures of Figs. 10 and 11 may be mounted;

Figs. 13 and 14 are detail front elevations illustrating some of the methods of the use of the invention.

In said drawings, in which like reference numerals refer to like parts throughout the several views, 1 is any suitable base having projecting upward therefrom a standard 2 which at its upper end has a forwardly projecting arm 3 supporting a body 4 made of wood, fiber, celluloid or other suitable light material. This body 4 may be of any size desired, but should be sufficiently large to accommodate a great number of points of attachment, which points are here indicated by plug holes 5. Immediately beneath the body 4 is a smaller body 6 which may be of any desired shape or outline, such as a disk, sphere, or otherwise, here shown as a disk having a rod 7 secured to the rear thereof and to a collar 8 adjustable vertically on the upright 2 and retained in adjusted position by set-screw 9. If desired, the rod 2 may be formed in two separate parts screw-threaded in their adjacent ends into a nut 10 as shown in Fig. 1, and the collar 8 may rest upon said nut as shown in said figure. The body 6 is provided with points of connection as plug holes 5', the number of holes in said body 6, however, being very much limited as compared with the number in the body 4. Suspended from the body 6 by any suitable means as for example a wire or cord 11, is a body 12 preferably of the same material as the bodies 4 and 6 and provided with a limited number of points of connection here shown in the form of plug holes 5''.

Cords, lines or wires 13 (see Fig. 3) are provided with plugs or pins 14 secured to the ends thereof, which plugs or pins 14 are shaped to snugly fit within their respective holes 5, 5' and 5'' as the case may be, all as will be readily understood from an inspection of Figs. 1 and 2.

In order that the anthropometer may be intelligently used it is necessary to point out that "reality" is made up in the rough of conglomerations of electricity in a permanent extremely complicated motion. Actually "matter", "space" and "time" are inseparably connected and cannot be divided. The reality about anything we can perceive, is in the rough an ever changing dance of electrons, which, as such, cannot be visually recognized. This something which we cannot recognize is called an "event" and may be represented by body 4 of the anthropometer. If we call the differences a "characteristic", then obviously the ever changing event has an infinity of characteristics. This infinitude of characteristics of an event is indicated by the upper irregular or broken off portion of the parabola disk or body 4 which is supposed to extend endlessly.

In the "event", which we never can recognize, there is something fairly permanent however, which we can recognize from day to day or century to century. This something fairly permanent, which we can recognize, we call an "object". The number of characteristics an object has is large, variable with every individual and finite. This is represented in the drawings by the fixed size of the objects (body 6 and the bodies illustrated in Figs. 5, 6 and 7), with a finite number of characteristics indicated by holes 5'. The "object" is therefore a first rough summary, a first generalization, a first abstraction of the event (reality), which is indicated by inserting several pins 14 into different holes 5 (characteristics) in the event (body 4) and connecting said pins by means of the cords 13 with other pins positioned in holes in the "object" body 6. Several of such sets of pins will indicate or visualize the process of abstracting from the "event" into the "object". We then name or label our first abstraction, the object (body 6) by a new summary or new second abstraction of the characteristics of said object, this new summary or abstraction, or abstraction of the second order, is the name, word or label, (body 12) as the meaning of the label is given by its definition. The number of characteristics which we ascribe to the label is still smaller. As illustrated in Fig. 2 four characteristics of the event (body 4) are abstracted into two characteristics of the object (body 6); and these two characteristics are abstracted, or summarized, a second time into one characteristic in the name or label, body 12. So we see that the label (body 12) is an abstraction from an abstraction, or, a second order abstraction.

This process of abstracting from the event to the object, and from the object to the label can be made closer to experience and much more complicated, by the use of more pins and cords of different colors representing the different senses and may greatly help not only in school experiments but in independent scientific research. As a rule, this process is complicated and cannot be fully described here, the teacher and the student must use his own judgment in observation of facts, combined with scientific theory. What is extremely important is to give to the student the consciousness of abstracting, to explain and show the mechanism of abstracting, and this is extremely easy with the aid of my anthropometer.

The "object" has been defined in terms of "recognition", therefore for animals who have the capacity of recognition there are also "objects". These "animal objects" (see Figs. 4 and 5), are often identified by the animal with some symbols or noises, the difference between these noises and human words being that the animal symbols are inherently taken by the animal for the object, he being not conscious of "abstracting" for he has no science. As the animal object is fairly similar to the human object, this is indicated by giving the body illustrated in Figs. 4 and 5 and body 6, similar forms, only the number of holes and the color of the objects are slightly different. The animal object 6' is provided with an animal symbol 6" which forms a part of the object 6'. Fig. 13 shows one of the applications. The anthropometer is set up as indicated in Fig. 1 and the object 6', is by the help of one of the longer arms 2 (see Fig. 8) secured to collar 8. This combination illustrates one of the most complicated and important facts, namely, that for man there are three separate entities, namely, the event (body 4), the first order abstraction, to wit, the object (body 6), and the second order abstraction which is the label (body 12).

The animal object 6' is in reality also a first abstraction from the same event (body 4), but the animal does not and cannot know it because it takes science to do so, which the animal has not, so he cannot be conscious of abstracting. He also cannot have a second order abstraction, the word or label 12, because it takes speech to do so, which he has not. For him his symbol 6" is permanently identified with, and equivalent to his object 6'.

This arrangement of parts clearly shows that the proper kind of human thought can only and exclusively be constructed by the permanent presence of a consciousness of abstracting. Animals are characterized by the absence of this consciousness of abstracting. If we believe falsely that the label 12 is the object 6 and the object is the event 4 we ignorantly imitate the animals which cannot distinguish between the three. This arrangement of the anthropometer makes obvious to the senses in an unforgetable way, even to a child, the proper use of the human mind which begins with the feeling and consciousness that we abstract and that all we know and can know are abstractions of different orders and abstractions only.

The anthropometer illustrates to the physical eye that a symbol is not the object and the object is not the event. Each has a different number of characteristics which is infinity for the event, one hundred let us say, for the object and ten for example, for the label. It will be understood that these numbers for the object and the label are only suggestive. The event 4 is an absolute variable, the object 6 a relative variable with every observer, while the label 12 is a constant when posited by a definition. The passions, emotions and all animal propensities reside in the mistaking of the labels 12 for the objects 6 which the labels cannot cover or express, and in the mistaking of the object 6 for the event 4.

Fig. 14 illustrates one of the possible research arrangements for the anthropometer. From one and the same event 4 we abstract different objects 6, 17 and 18. We label them and from the different labels 12, 12", 12"' we abstract a new abstraction of the third order represented by body 12ª. We may also disregard in this case the event 4 and set up the three different objects 6, 17, and 18 as they are, but assume that they are situated in different events and build up similarly abstractions of higher orders.

Figs. 10 and 11 show the possible use of the two objects 17 and 18 mounted on stands 15 by the aid of arms 16. Object 18 symbolizes the human brain, nerve system, etc., as a whole. While object 17 symbolizes similar organs as a whole of the animal. Let us suppose that we show to both of these individuals, which possess the above mentioned organs, a stone. The one gets a picture which may be marked by means of a pin inserted in object 18, the other gets a picture which is marked by a pin inserted in object 17; now let us show to both another stone. Both of the individuals get another picture which is marked by additional pins. The two pictures in both overlap somehow, some phsyco-chemical processes are going on and the different stages of these processes may be indicated by additional pins inserted in body 17 and 18 saying that "something happens" as the result of these phsyco-chemical pens; but the crucial point of the problem is that in object 18, as the result of this overlapping of pictures, a concept happens, namely, "two stones", indicated by a cord connecting bodies 18 and 19. In the animal, however, this does not happen. We label this concept, illustrated by the cord, by a label 19. It is again obvious that at every stage, with the animal, the four factors, illustrated by the pins in body 17, count; with man at every stage, five factors count, illustrated by the pins in body 18 and the cord connecting bodies 18 and 19. None of these factors is independent as such but they are stages of a process. With animal it matters what an animal is; with man it matters not only what a man is but even more what he thinks he is.

The underlying theory is fundamental and represents the best ascertained scientific facts of natural sciences and mathematics, which cannot be explained here. This description is enough for an intelligent use of the anthropometer. Objects 17 and 18 have the same vertical side sections. They may be used to demonstrate that objects of different shapes for those observers who face the front of objects 17 and 18 may have like shapes to other observers who face the ends or vertical side sections of said objects. These differences of opinion vanish when the shapes are given by analytical correct definitions embodying manifold observations of many observers, the ideal being to have the same formulations valid for all observers.

From the foregoing it will be apparent that I have devised an educational apparatus which may be extremely useful to the teacher and to the scientific student in demonstrating abstract theories and in setting objectively before the student the shortcomings in words, symbols or definitions in characterizing objects and the infinite variety of combination of characteristics or qualities which are possible in different objects thereby enabling the student to appreciate the reasons for differences and the shortcomings in defining objects and their characteristics and differences.

Many other uses will suggest themselves to scientific observers, teachers and students.

What is claimed is:—

1. In a device of the character described, the combination of a body shaped to denote a figure of indefinite extent and having a number of points of attachment, a plurality of bodies shaped to denote bodies of finite extent, each of which bodies has a plurality of points of attachment, cords extending from various points of attachment in said first-named body to each of said plurality of bodies, a plurality of additional bodies each provided with a number of points of attachment, and lines of attachment extending from said first-named plurality of bodies to said second-named plurality of bodies.

2. In a device of the character described, the combination of a body shaped to denote a geometric figure of infinite extent and having plug holes throughout its extent indicative of the characteristics or qualities of an event, a second body shaped to denote a body of finite extent and having a number of plug holes, a plurality of cords plugged into a plurality of plug holes in said first-named body and into a single plug hole in said last-named body.

3. In a device of the character described, the combination of a body shaped to illustrate a figure of infinite extent and having a plurality of plug holes indicative of the characteristics or qualities of an event, a second body shaped to denote a body of finite extent and having a definite number of plug holes, and a plurality of connecting members plugged into a plurality of plug holes in said first-named body and into a single plug hole in said last-named body, and a third smaller body having a plurality of connecting members plugged into a plurality of holes in said second-named body and leading to a plug hole in said last-named body.

4. In a device of the character described, a supporting stand, a body shaped to denote a figure of indefinite extent, and having a plurality of points of attachment thereon, a second body also mounted on said stand and shaped to denote a body of finite extent and having a plurality of points of attachment, and a third body of smaller size supported on said second body, said third body having a number of points of attachment and a plurality of lines leading from a plurality of points in said first-named body to a single point of attachment on said second-named body, and a single line leading from said single point in said second body to said last-named body.

ALFRED KORZYBSKI.